US005630069A

United States Patent [19]
Flores et al.

[11] Patent Number: 5,630,069
[45] Date of Patent: May 13, 1997

[54] METHOD AND APPARATUS FOR CREATING WORKFLOW MAPS OF BUSINESS PROCESSES

[75] Inventors: Fernando Flores, Berkeley; Chauncey F. Bell, III; Pablo A. Flores, both of Alameda; Rodrigo F. Flores, Berkeley, all of Calif.; Raul Medina-Mora Icaza, Mexico City, Mexico; Jaime G. Vasquez, Alameda; Thomas E. White, Monte Sereno, both of Calif.; Russell G. Redenbaugh, Philadelphia, Pa.; John A. McAfee, Kensington; Bart A. Macleod, Alameda, both of Calif.; Juan L. Saldivar, Mexico City, Mexico; Terry A. Winogard, Stanford; Robert P. Dunham, Pleasanton, both of Calif.

[73] Assignee: Action Technologies, Inc., Calif.

[21] Appl. No.: 5,236

[22] Filed: Jan. 15, 1993

[51] Int. Cl.⁶ .................................................. G06F 17/60
[52] U.S. Cl. ...................................................... 395/207
[58] Field of Search ................................. 364/400, 401, 364/408, 401 R, 402

[56] References Cited

U.S. PATENT DOCUMENTS

| | | | |
|---|---|---|---|
| 3,736,409 | 5/1973 | Boyan . | |
| 5,140,537 | 8/1992 | Tullis | 364/401 |
| 5,182,705 | 1/1993 | Barr et al. | 15/22 |
| 5,233,513 | 8/1993 | Doyle | 364/401 |
| 5,249,120 | 9/1993 | Foley | 364/401 |
| 5,301,320 | 4/1994 | McAtee et al. | 395/650 |
| 5,319,543 | 6/1994 | Wilhelm | 364/401 |

OTHER PUBLICATIONS

Scherr, "A New Approach to Business Processes," *IBM Systems Journal*, vol. 32, No. 1, Mar. 1993, pp. 80–98.
Cowart, *Mastering Windows 3.1*, 1992, p. 192.
Dyson, "Workflow," *Forbes*, vol. 150 No. 12, Nov. 23, 1992, p. 192.
Dialog Product Description: Project Vision Level 21.2 Inmax Publishing, Ltd., Date of Released Aug. 1989.
Dialog Product Desc: Design/IDEF 3.0, Meta Software Corp., Released Jan. 1987.
Baumann,"Automated Workflow Control: Key to Office Productivity." AFIPS Conf. Proceedings, 1980.
"Cimage Launches Workflow Package for Engineers," *Computer Product Update*, Jul. 17, 1992.

*Primary Examiner*—Gail O. Hayes
*Assistant Examiner*—Hayward Verdur
*Attorney, Agent, or Firm*—Blakely Sokoloff Taylor & Zafman

[57] ABSTRACT

The invention is a method and system which provides consultants, business process analysts, and application developers with a unified tool with which to conduct business process analysis, design, and documentation. The invention may be implemented using a software system which has two functional sets. One is a set of graphical tools that can be used by a developer or business analyst to map out business processes. The second is a set of tools that can be used to document and specify in detail the attributes of each workflow definition, including roles, timing, conditions of satisfaction, forms, and links required to complete a business process definition. The invention utilizes fundamental concept of workflow analysis that any business process can be interpreted as a sequence of basic transactions called workflows.

26 Claims, 10 Drawing Sheets

METHOD AND APPARATUS FOR CREATING WORKFLOW MAPS OF BUSINESS PROCESSES

BRIEF SUMMARY OF THE INVENTION

The invention is a method and system which provides consultants, business process analysts, and application developers with a unified tool with which to conduct business process analysis, design, and documentation. The invention may be implemented using a software system which has two functional sets. One is a set of graphical tools that can be used by a developer or business analyst to map out business processes. The second is a set of tools that can be used to document and specify in detail the attributes of each workflow definition, including roles, cycle time, conditions of satisfaction, associated text, forms, and links required to complete a business process definition.

A fundamental concept of workflow analysis is that any business process can be interpreted as a sequence of basic transactions called workflows. Every workflow has a customer, a performer, and conditions of satisfaction. The customer and performer are roles that participants can take in workflows. In addition, each workflow can have observers.

In a workflow, the customer is the person for the sake of whom the work is done, either because they made a request or accepted an offer. It is customers who are responsible for evaluating performed work and determining whether this work meets their conditions of satisfaction.

The performer is the person who is responsible for completing the work and for declaring to the customer when the work is done.

Requests and Offers are the two basic types of workflows. The conditions of satisfaction specify the work to be performed by the performer. In a request, the customer specifies the conditions of satisfaction, and in an offer the performer specifies them. (Then, of course, the two can enter into negotiation about the work to be done.)

For example, given the sentence:

"John asked Frank to prepare the report and deliver it by noon on Friday,"

John is the customer for this workflow, Frank is the performer, and the conditions of satisfaction are "prepare the report and deliver it by noon on Friday." Further, because John asked for the report rather than Frank offering it, this workflow is of the type Request.

Given the sentence:

"John proposed to prepare the report and deliver it by noon on Friday for Frank,"

John is the performer for this workflow, Frank is the customer, and the conditions of satisfaction are still "prepare the report and deliver it by noon on Friday." Further because John proposed the report rather than Frank asking for it, this workflow is of the type Offer.

Observers of workflows take no direct action; they usually observe for management or training purposes.

An important part of a workflow analyst's work is the development of business process maps, with which the analyst and his/her client can readily see and interpret the structure of a business process, and identify quickly areas for clarification or improvement.

Business process maps display the workflows as loops, and display the relevant information about each workflow— the customer, the performer, the conditions of satisfaction and the cycle time.

Further, a business process map displays the relationships among workflows, called links. For example, in a loan approval business process, the workflow in which the loan is approved is linked to the workflow in which the bank issues a check. If the loan is approved, that triggers the initiation of the "write check" workflow. If the loan is not approved, the secondary workflow "write check" is not initiated.

Workflow maps highlight the following features of business processes:

- the conditions of satisfaction of both internal and external customers;
- the roles of process participants;
- which workflows are primary and which workflows are secondary to the business process;
- what work is performed in serial; what work is performed in parallel;
- cycle times for the process, each workflow in the process and the phases of each workflow.

Additionally, workflow maps enable analysts to identify opportunities for improvement because workflow maps:

- clarify business processes;
- identify where roles are unclear or missing;
- clarify customer conditions of satisfaction;
- identify where customer expectations are unclear or do not match work performed;
- indicate where work is redundant or is performed serially when the work could be performed in parallel.

In U.S. Pat. Ser. No. 5,216,603 issued Jun. 1, 1993 and U.S. Pat. No. 5,208,748, issued May 4, 1993, both owned by Action Technologies, Inc., the assignee of the present application, methods and systems for managing workflows, called conversations in the referenced applications, are described. However, the teachings in the cited references are limited to single workflows with no capability for mapping business processes made up of a number of workflows linked together.

DETAILED DESCRIPTION OF THE INVENTION

OVERVIEW

The present invention is a method and system which is used to:

- support the work of analyzing and mapping existing business processes and designing new business processes;
- shorten the cycle time of producing workflow enabled applications which allow users and managers to participate in and manage business processes;
- reduce existing coordination problems between business process analysts and programmers;
- develop maps of a business process;
- document a business process;
- test maps of a business process for completeness and consistency.

The invention, which is referred to as a workflow analyst, is a component of a complete workflow system. The invention is the component of the system that allows creation of workflow maps of business processes. These maps are an input to another component of a complete workflow system, which component is referred to as a workflow application builder.

Figure 1A:
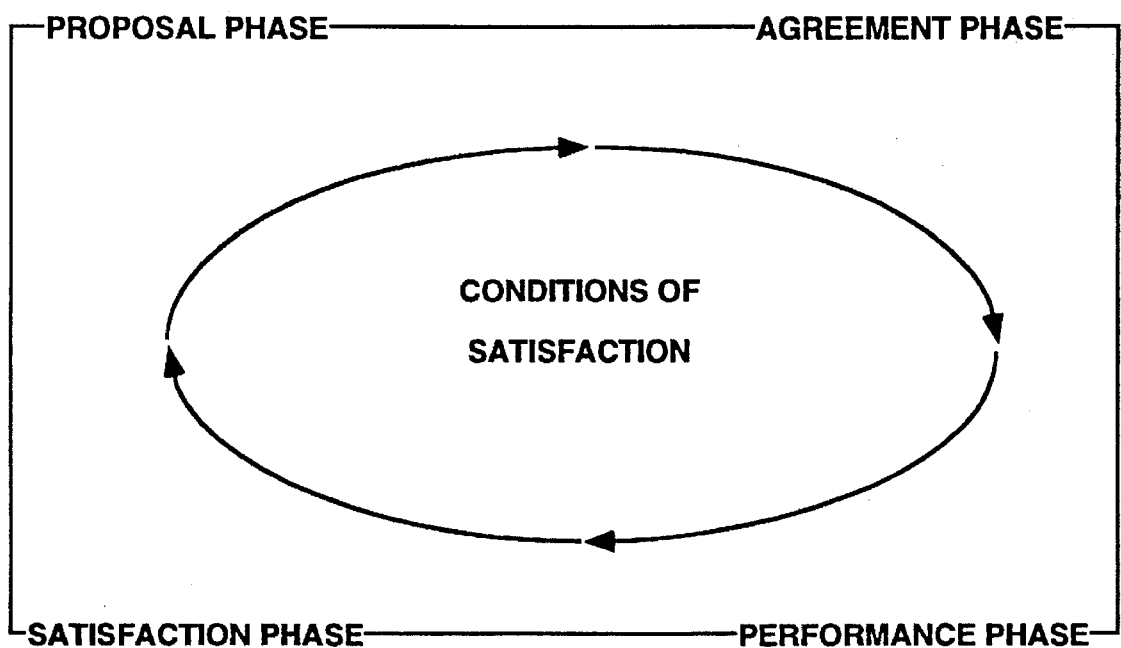
FIG. 1a is pictorial representation showing the phases of a single workflow.
Figure 1B:
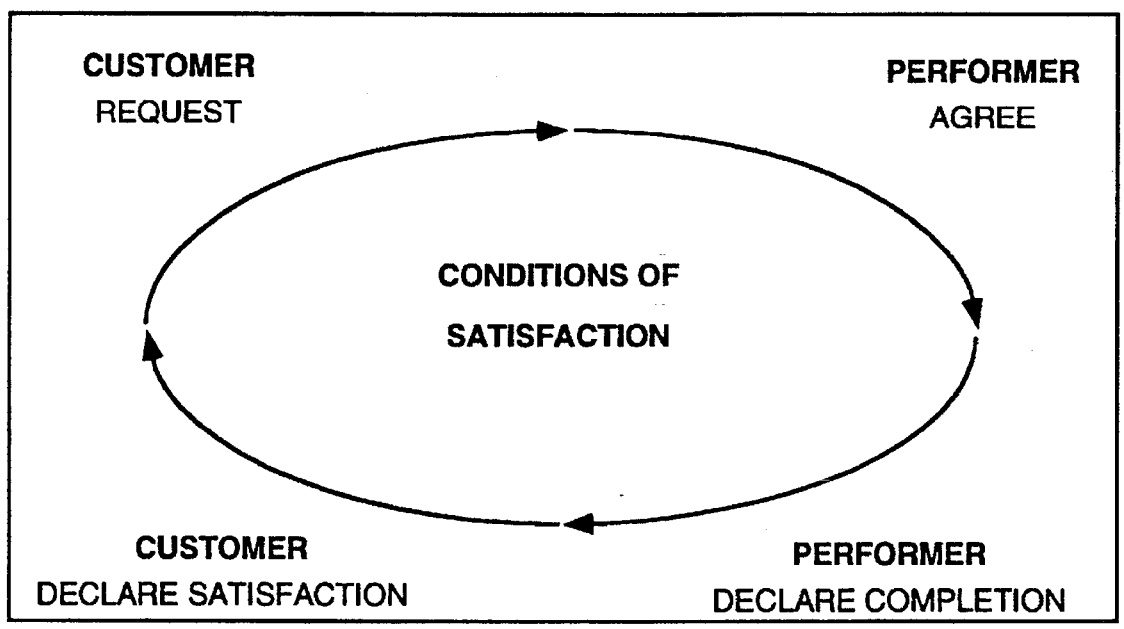
FIG. 1b is pictorial representation of a single workflow showing the normal flow of a request type workflow.
Figure 1C:
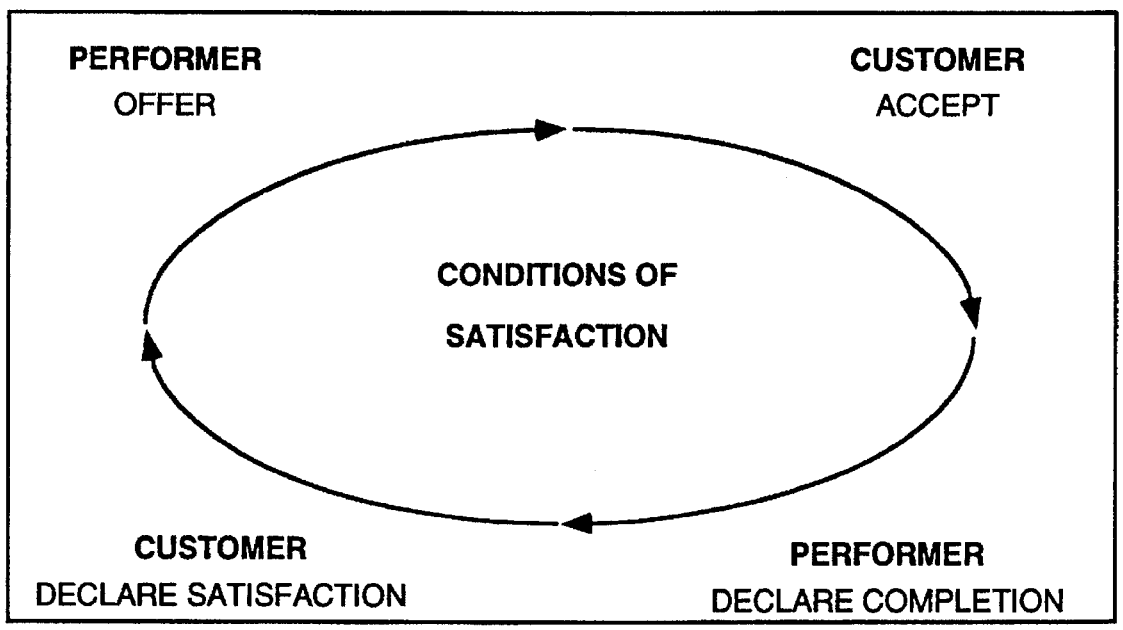
FIG. 1c is pictorial representation of a single workflow showing the normal flow of a offer type workflow.
Figure 1D:
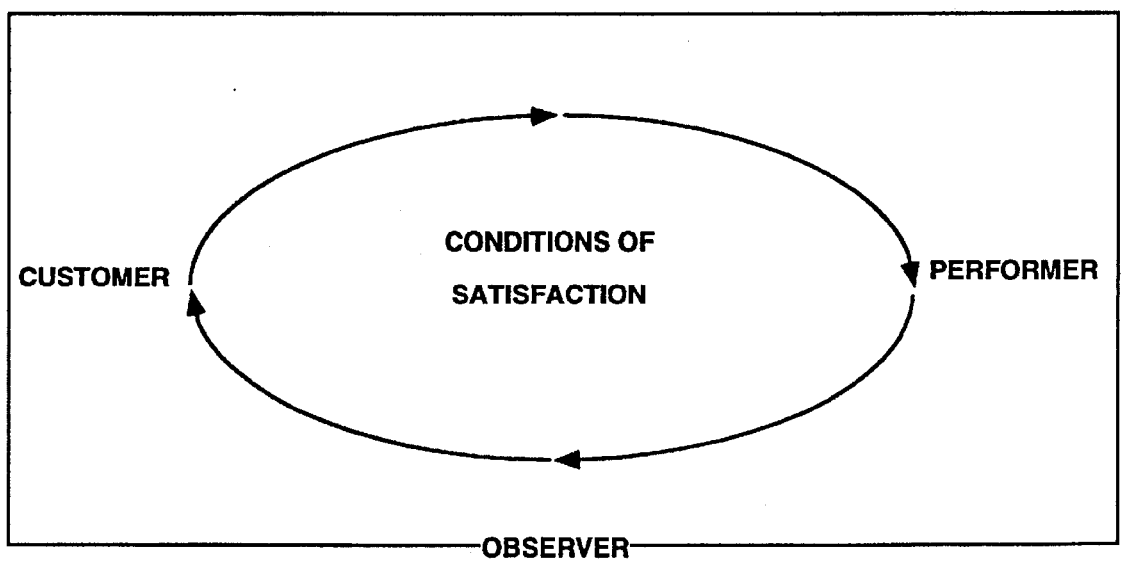
FIG. 1d is pictorial representation of a single workflow showing the roles of participants of a workflow.
Figure 1E:
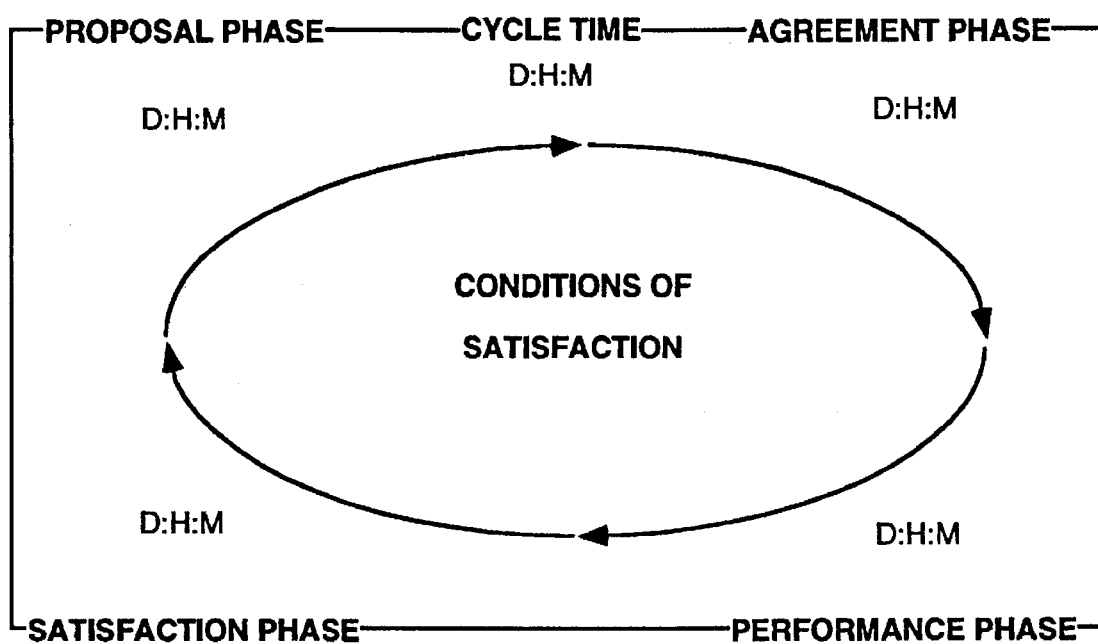
FIG. 1e is pictorial representation of a single workflow showing workflow cycle times.
Figure 1F:
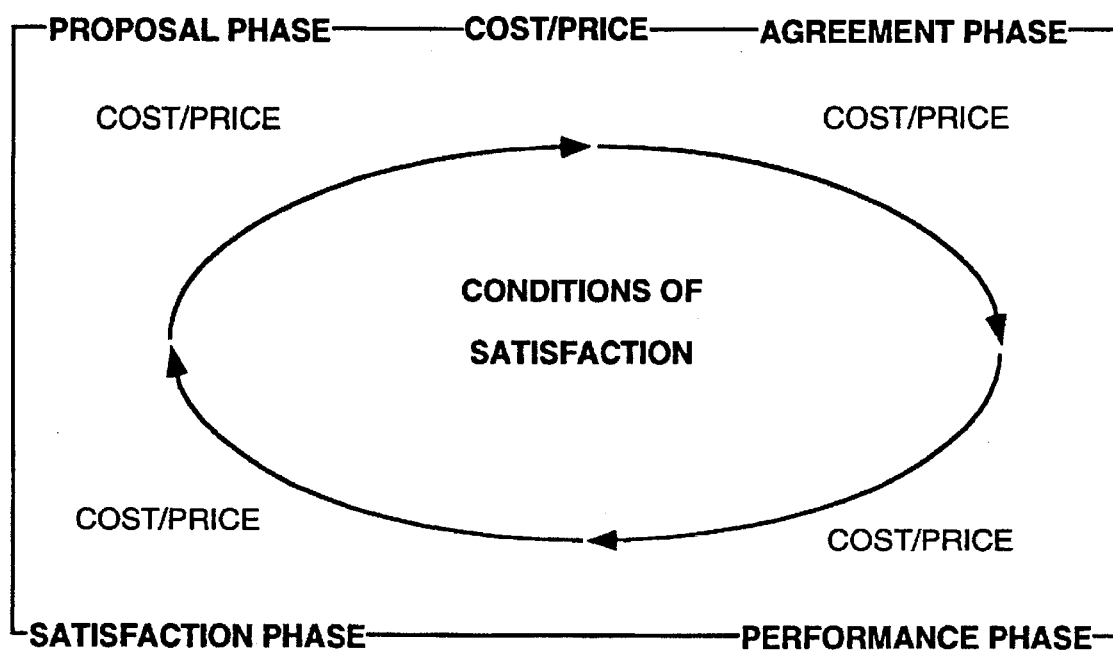
FIG. 1f is pictorial representation of a single workflow showing workflow cost/price.

A single workflow is shown in FIGS. 1a–1f as an elliptical loop with arrows shown in a clockwise direction wherein each quadrant of the ellipse signifies different phases of the workflow. The first phase is called the proposal phase during which a request is made of the prospective performer by a customer (FIG. 1b) or an offer to a customer is made by a prospective performer (FIG. 1c). The second phase is called the agreement phase during which the offer is accepted by the customer or the request is agreed to by the performer and conditions of satisfaction are identified. Of course, during the agreement phase the original conditions of satisfaction can be negotiated by the customer and performer until an agreement is reached. The third phase is called the performance phase during which the performer undertakes to meet the agreed to or accepted conditions of satisfaction. When the performer believes that the conditions of satisfaction have been met, the performer declares completion. The last phase is the satisfaction phase during which the customer determines whether or not the conditions of satisfaction have been met by the performer, and if so, declares satisfaction.

Figure 2:
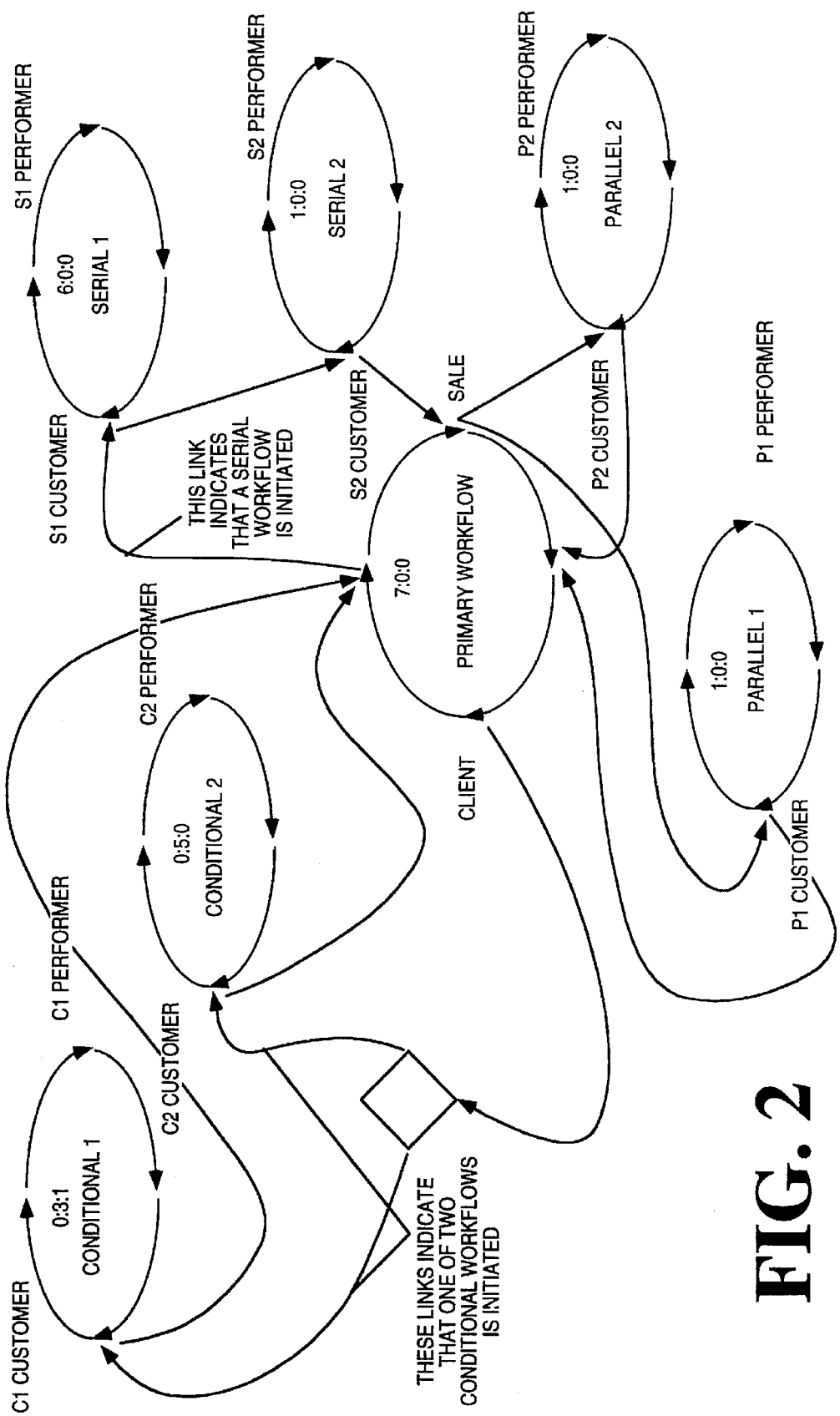
FIG. 2 is pictorial representation of business process, i.e., a set of linked workflows.

FIG. 2 is a business process map having a primary workflow 11, conditional workflows 13 and 15, a conditional link 17, parallel workflows 19 and 21, serial workflows 23 and 25. It should be noted that while a business process such as the one shown in FIG. 2 can be graphically represented by any one of a number of prior art drawing programs capable of drawing shapes, curved lines, straight lines and arrowheads, such prior art programs have no ability to associate with each workflow various parameters such as roles, cycle time, conditions of satisfaction or associate semantics to the links that imply automated action or provide the framework for application building, all of which are necessary to create a useful business process representation.

A workflow can be linked (and initiate) multiple workflows from one of its phases. If all the workflows start at the same moment, the multiple workflows are said to have started in parallel. Multiple workflows can also be started serially. There are two mechanisms to indicate the serialization of workflows. As illustrated in FIG. 2, workflows serial 1 and serial 2 are sequential workflows. The primary workflow at the beginning of the agreement phase, has a link to start workflow serial 1. Workflow serial 2 is linked from the satisfaction phase of workflow serial 1. Upon satisfaction of workflow serial 2, there is a link back to the primary workflow.

An alternative mechanism would be to illustrate the sequential linking by positioning the tails of the links along the arrow of the quadrant of the originating workflow in sequence. First a link to a first serial workflow which is then linked back to the originating workflow, and then a link to a second serial workflow whose tail is positioned along the arrow line of the phase indicating the sequencing.

In workflow analysis practice, it is often necessary and useful to construct business process maps that do not have the four complete phases to illustrate breakdowns in the process. The invention provides a mechanism to select a specific workflow phase and hide it, thus producing workflows that are missing those phases.

Components of a Workflow System

Figure 3:
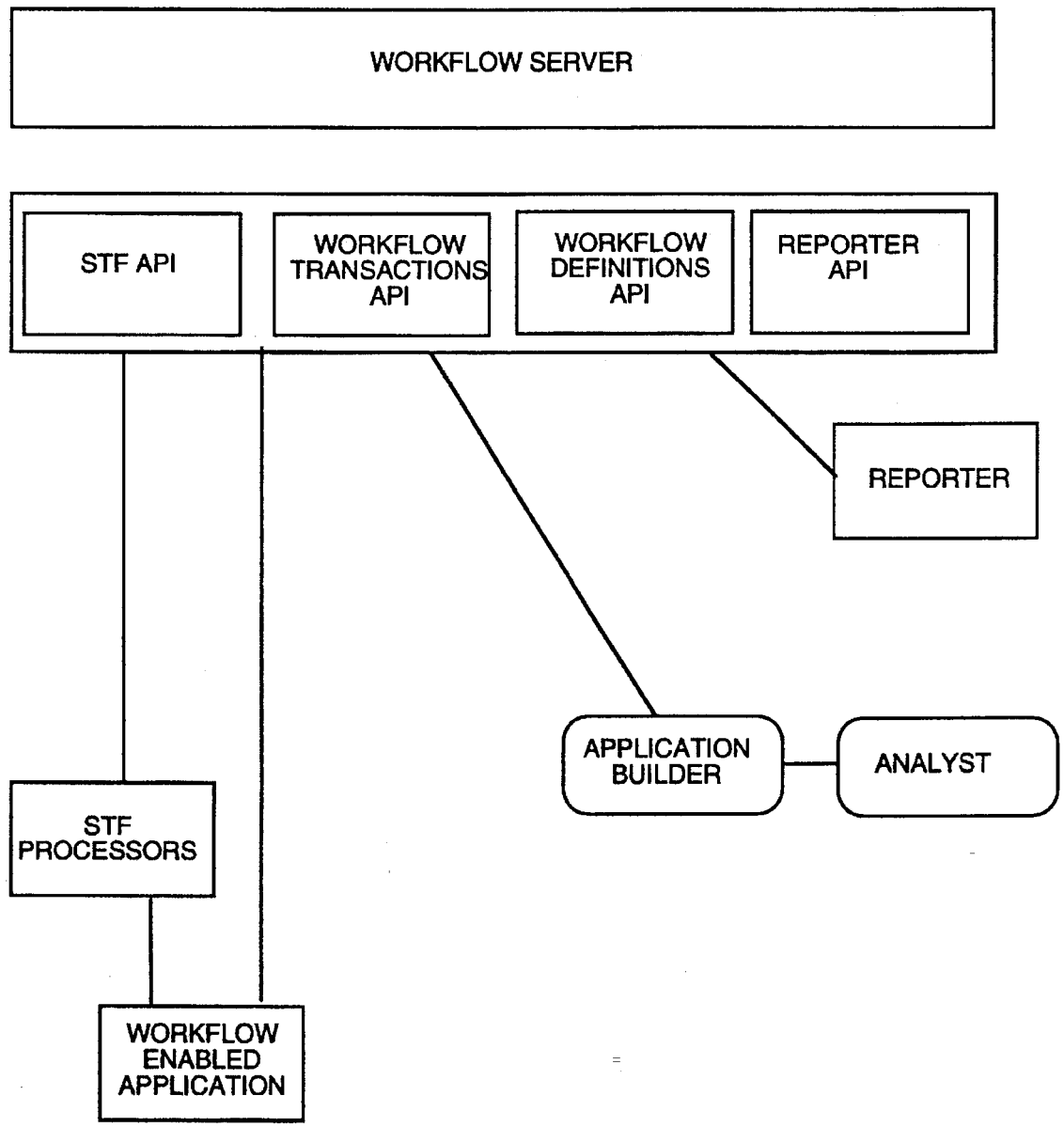
FIG. 3 is a block overview diagram of a complete workflow system showing how the present invention interfaces with the rest of the workflow system.

Although the present invention is one element of a complete workflow system, and details of other elements of a workflow system are not needed to obtain an understanding of the invention, a suitable workflow system in which the present invention may be utilized incorporates the following components which are shown in FIG. 3.

Workflow Server

The workflow server is the heart of a workflow system. The workflow system concentrates workflow operations in the workflow server rather than in the end user applications. By using this client/server design, applications do not need to have the intelligence about workflows as part of their design. Application developers can concentrate on their particular application development not having to worry about workflow logic and overhead because such functionality is handled at the server. The workflow server includes a transaction manager, workflow processor, workflow updater, workflow language interpreter and agent manager. The workflow server utilizes a definitions database, transactions database and names/routings database. The transaction manager identifies changes that have happened in the workflow transaction database and invokes the proper server modules to provide the services that have been requested or that those changes represent. The workflow processor embodies the logic of workflows with phases, actions, roles and dates of completion and reply. The workflow updater maintains and updates the workflow transaction database. It uses the workflow processor to determine the status of workflows and the set of possible actions for each one of the roles. The workflow language interpreter interprets workflow language scripts. These scripts contain workflow commands, such as the initiation or taking an act in a workflow. These scripts are part of the business process definition. These scripts are automatically generated by the application builder. The agent manager executes workflow commands. "Agents" take action on behalf of some role in a workflow. The commands that the "agents" execute are specified through the workflow language.

The definitions database contains records that define each type of business process and workflow in the system. These records are used by the workflow updater and workflow processor to determine new workflow states and available actions.

The transactions database contains the history of completed workflows and workflows-in-progress. These records are used by the workflow updater and workflow processor to determine new workflow states and available actions.

The names/routing database contains the record of roles and identities of the organization where the workflow system has been installed.

In addition to the workflow server, a complete workflow system of the type in which the present invention may be utilized includes a set of application program interfaces (APIs), standard transaction format (STF) processors, application builder, analyst and reporter components as follows.

Workflow APIs

The workflow APIs provide a programming interface to access the services of the workflow server. STF processors (described below) and the application builder are all developed using these APIs.

Workflow-Enabled Application

A workflow-enabled application interfaces to the server via the transactions database of the workflow server or via APIs, or via messaging, database, or inter-process communications (IPCs) or through the use of an STF processor.

STF Processors

A standard transaction format (STF) processor is an application whose job is to interface external systems to the workflow system. There is one STF processor for each different type of system that interfaces to the workflow system.

STF processors can be of three types: message, database, and IPC. The STF processor of FIG. 3 corresponds to a workflow-enabled application type.

The STF processors translate between an application's data format and the workflow APIs. It is the job of the particular STF processor developer to design the mapping of the external system and the workflow APIs.

Workflow Application Builder

The workflow application builder is a Graphical User Interface (GUI) application that allows a business process designer to specify the business process design with its network of workflows. The application builder, in turn, creates or edits the workflow definitions databases that define the business process and that will be used by the workflow server.

Workflow Analyst

The workflow analyst, which is the invention described herein, is a GUI application that allows a business process analyst to specify the map of business processes with its network of workflows. Its output is readable by the application builder which will update the definitions database of the server.

Workflow Reporter

The workflow reporter is a GUI application that provides an interface to the transaction databases of the system. It allows the observation of the status of current transactions as well as the history and performance of past transactions.

In describing the invention, the following terms with their indicated definitions are used:

Act

Basic linguistic occurrence by which people intervene in moving a workflow towards completion.

Agreement

The outcome of the negotiation phase, in which two parties come to a common agreement of the conditions of satisfaction.

Business Process

A network of workflows linked together that represent the recurrent process by which an organization performs and completes work, delivers products and services and satisfies customers.

Business Process Map

This is a graphical representation of business process, which shows its workflows and their relationship.

Primary workflow

This is the first workflow which is initiated when a business process is initiated. Its condition of satisfaction represent the condition of satisfaction of the business process.

Conditional Link

A link that indicates that only one of a group of workflows will be triggered based on some condition.

Conditions of Satisfaction

Conditions declared by or agreed to by a customer. The fulfillment of which is the purpose of a workflow.

Customer

The role in a workflow who makes a request or accepts and offer.

Customer Satisfaction

The objective of a workflow, the accomplishment of which is declared by the customer when the conditions of satisfaction in the workflow have been fulfilled.

Cycle time

A measure of the time from initiation to successful completion of a workflow phase, a complete workflow or a business process.

Exception flow

The path in the business process workflow map which is followed if a customer cancels or a performer revokes or declines.

Link

A defined dependency between two workflows and the mechanism by which dependencies between workflows is established.

Loops (Workflow)

A workflow is represented graphically by an elliptical loop with arrows shown in a clockwise direction wherein each quadrant of the ellipse signifies different phases of the workflow.

Normal flow

This is the path followed in a business process map when workflows complete with customer satisfaction.

Observer

A role in a workflow who cannot perform acts in the workflow, but is informed of acts in the workflow, and has access to the information and data associated with the workflow.

Offer

The act by which the performer can initiate a workflow, specifying conditions of satisfaction that he is willing to satisfy for a customer.

Organization roles

Named positions in an organization who are authorized to make certain requests, agreements, take certain actions, set certain policies, and make certain decisions. The kind of roles will be accountant, office manager, etc.

Performer

One of the principal roles in a workflow: the role that commits to complete the conditions of satisfaction.

Phase

A characterization of the status of a workflow based on the acts that have happened and the acts that are permitted.

Request

A customer does this act to initiate a workflow and declare conditions of satisfaction.

Trigger

An action in a workflow which causes an action in some other workflow.

Triggered

Action in a workflow based on certain conditions/status in some other workflow.

Workflow

A structured set of acts between customers and performers organized to satisfy a customer's conditions of satisfaction.

Workflow Activation

A triggered action that enables the customer or performer of the workflow to take the initial act of the workflow.

Workflow Initiation

An act of request or offer initiates a workflow.

Workflow Roles

The association of participants in the workflows that take the acts in workflows; three roles are distinguished in workflows: customer, performer, and observer.

Workflow Type

This indicates whether the workflow is of request or offer type.

OPERATIONAL DESCRIPTION

The invention utilizes a graphical user interface in a computer system which incorporates a graphical user interface (GUI) such as the Microsoft Windows (Win3.1+) environment, using MDI and Windows HELP facility. A display on a video monitor includes a toolbar which is provided for the actions that need to be immediately accessible. A status bar is used to display information (e.g. the function of the currently selected menu option and the like). Dialog boxes are used where appropriate.

Typically, a workflow map, as it appears on a monitor in a size suitable for comfortable viewing, is larger than the screen. For this reason, horizontal and vertical scroll bars allow the user to scroll through the entire map.

The status bar is used for displaying information only.

The user is prompted for confirmation on deletion of workflows and links. Objects such as workflows, links, annotated text, etc. may be moved around on the screen by typical clicking and dragging of a mouse as occurs in a GUI.

The invention produces standard workflow maps of business processes that show workflows and the links defined between workflows.

The user of the invented system is known as a business process analyst. To use the system, the business process analyst first creates a business process which may be defined in terms of a business process map. A business process map contains customer and performer names and organizational roles for the primary workflow, target cycle times for the entire process, version of the process, when and by whom the process may be started, and so forth. In addition, it contains workflow and link definitions for each workflow and link in the process.

Workflows are represented graphically as elliptical loops with four phases as shown in FIGS. 1a–1f. Each workflow, and each phase within the workflow, has a starting point and an ending point. The primary workflow of the business process is displayed as a large elliptical loop to make it visually distinct as shown in FIG. 2.

Workflows can be created without having all links defined such that the user is able to link them afterwards. In addition to the loop, the workflow attributes workflow name, customer, performer, conditions of satisfaction, cost and price (or value) for the workflow and each phase and cycle times for the entire workflow and each phase are displayed. Furthermore, if a form name attribute is specified then a form icon and name will also be displayed. The form name attribute is for identifying any electronic or paper forms associated with the workflow.

The invention supports two types of workflows:
Request; and
Offer.

The invention supports three different roles for each workflow:

Customer: The organizational role or name of the person that can declare satisfaction for the completion of the workflow.

Performer: The organizational role or name of the person who fulfills the conditions of satisfaction of the workflow.

Observer: The organizational role or name of persons who neither declare satisfaction nor fulfill the conditions of satisfaction but who monitor the workflow for management, training, or to fulfill other organizational concerns.

Each workflow has a unique name that identifies it in the business process.

The conditions of satisfaction of a workflow are the conditions that will satisfy the customer of a request or offer.

The cycle time of a workflow is the time to achieve customer satisfaction and reach agreement which are specified for each workflow. The cycle time for each phase is the time it is expected to complete the phase. Cycle time includes days, hours, and minutes for all cases.

Each workflow can have associated text. Such text could be used, for example, to describe the workflow in narrative form in order to construct the narrative of the process.

A workflow may also have a form name which is the name of a form that is associated with the workflow. As noted above, a form refers to any electronic or paper forms associated with the workflow.

When a workflow is created on a business process map, the user is given an accessible way to enter the workflow attributes namely, workflow name, customer, performer, conditions of satisfaction, costs and prices (or values), cycle times, and type of workflow.

In many cases of a business process, a workflow represents a collection of workflows rather than a single workflow. This collection of workflows have the same conditions of satisfaction (and hence can be observed as a single workflow). These workflows are multiple in that they either have multiple performers in the request type case, or multiple customers in the offer type case. These workflows are repeating in that there will be a set of similar workflows managed by the workflow system.

The graphical representation to indicate multiple repeating workflows is accomplished through an additional arrow under the current arrow of the third quadrant.

To input all of the workflow attributes, the user could select the workflow, double-click it and enter all the information through a standard dialog box.

A link specifies the relationship between two workflows, i.e. an action in one workflow causes an action in another workflow. When such a relationship is established, it is said that the second workflow is linked to the first.

A link contains definitions of trigger conditions and the actions that result from those trigger conditions. The trigger conditions are either:
Workflow-Act based; or
Workflow-State based.

Triggered actions to be taken are:
Workflow initiation;
Workflow activation;
Workflow acts;
Workflow states; or
Prompt for conditions for conditional link.

Links are represented graphically as lines with arrowheads that connect two workflows.

The arrowheads indicate that a triggered action happens in the workflow pointed to by the arrowhead due to the trigger action in the workflow at the tail of the line. The "tail" of each line anchors to the trigger action, and can be placed in any part of the loop phase, indicating sequencing of triggering action. The "head" of the line indicates the triggered action.

Conditional links are indicated with a diamond icon.

To establish a link, the user selects one workflow and draws a link to a second workflow.

When a new link is drawn, the default values are as follows:

The trigger action is either of type Act or type State. The user interface allows specifying the trigger action type. The triggered action default value is Initiate or Activate depending on where the arrow was drawn to (the beginning or end of the first phase).

There are two kinds of links, those that correspond to the "normal" flow of the process and those that correspond to the "exception" flow of the process. The latter are links triggered by cancel, revoke or decline acts.

Table I establishes the relationship between triggering and triggered actions under normal and exception cases.

TABLE I

|  | Request | Offer |
|---|---|---|
| Outgoing Links | | |
| Out from Initial state | | |
| Default trigger act | Activate | Activate |
| Other valid trigger acts | none | none |
| Valid trigger state | Initial | Initial |
| Out from Negotiation state | | |
| Default trigger act | Request | Offer |
| Other valid trigger acts | Cancel, Decline, Counter-Offer, Accept Counter-Offer, Decline Counter-Offer | Cancel, Decline, Counter-Offer, Accept Counter-Offer, Decline Counter-Offer |
| Valid trigger state | Negotiation | Negotiation |
| Out from Agreement state | | |
| Default trigger act | Agree | Accept Offer |
| Other valid trigger acts | Cancel, Decline, Declare Dissatisfaction | Cancel, Decline, Declare Dissatisfaction |
| Valid trigger state | Agreement | Agreement |
| Out from Completion state | | |
| Default trigger act | Declare Complete | Declare Complete |
| Other valid trigger acts | Cancel, Revoke | Cancel, Revoke |
| Valid trigger state | Completion | Completion |
| Out from Satisfaction state | | |
| Default trigger act | Declare Satisfaction | Declare Satisfaction |
| Other valid trigger acts | Cancel | Cancel |
| Valid trigger state | Satisfaction | Satisfaction |
| Incoming Links | | |
| Into Initial state | | |
| Default trigger act | activate | activate |
| Other valid trigger acts | none | none |
| Valid trigger state | Initial | Initial |
| Into Negotiation state | | |
| Default trigger act | Initiate (Request) | Initiate (Offer) |
| Other valid trigger acts | Cancel, Decline, Counter-Offer, Accept Counter-Offer, Decline Counter-Offer | Cancel, Decline, Counter-Offer, Accept Counter-Offer, Decline Counter-Offer |
| Valid trigger state | Negotiation | Negotiation |
| Into Agreement state | | |
| Default trigger act | Agree | Accept Offer |
| Other valid trigger acts | Cancel, Decline | Cancel, Decline |
| Valid trigger state | Agreement | Agreement |

TABLE I-continued

|  | Request | Offer |
|---|---|---|
| Into Completion state | | |
| Default trigger act | Declare Complete | Declare Complete |
| Other valid trigger acts | Cancel, Revoke | Cancel, Revoke |
| Valid trigger state | Completion | Completion |
| Into satisfaction state | | |
| Default trigger act | Declare Satisfaction | Declare Satisfaction |
| Other valid trigger acts | Cancel | Cancel |
| Valid trigger state | Satisfaction | Satisfaction |

The Acts are Activate, Request, Agree, Offer, Accept Offer, Counter-Offer, Accept Counter-Offer, Decline Counter-Offer, Declare Completion, Declare Satisfaction, Declare Dissatisfaction, Cancel, Revoke, Decline.

The user is able to draw a link between two workflow loops on a map by selecting the "from quadrant" and the "to quadrant" in each of the loops. The initial portion of the link is drawn as a straight line. The user may then create a drawing handle on the link line and "pull" the line into a curve. The user may create multiple points on a line to aid in drawing an "S" or other multi-shaped curve. Such drawing handles and multiple points may be created by mouse clicks at the desired points in the link.

A user may change the destination of a link by selecting and dragging with the mouse.

When a link between two workflows is conditional, a conditional icon is drawn between the workflows. To link more workflows conditionally, the user links a new target workflow to the conditional icon.

Basic Tools

The invention provides a set of basic tools for drawing, filing, editing, printing, viewing and manipulating business processes, workflows, and links. The most frequently used of these tools are available through icons.

Workflow Mapping Tools

To facilitate the definition of business processes, the invention provides tools for drawing maps of workflows and the links between them. The lines are Bezier-like and are for drawing a line from the termination of one phase in a workflow to another phase in another workflow. The line contains handles which allow the line to curve.

Map Drawing Tools

The invention supports the following map drawing tools:
Draw Workflow
Draw Links
Draw Conditional link
Annotate Text.

File and Print Tools

The invention provides file and print-related tools that enable the user to:
Create a new business process map
Open an existing business process map for read, display and edit
Save a business process map to a file
Provide summary information about a business process map.
Print the map and reports of the business process.

Edit Tools

The invention provides editing functions that enable the user to:
Cut, copy, delete and paste workflows, links, and annotated text. Using edit operations in conjunction with the clipboard, it is possible to cut or copy objects (expanded and collapsed workflows, links, text) and paste them in the same or different business process. It is also possible to paste these objects in drawing packages.

Editing Attributes

Edit any element of the business process map, such as workflow attributes, links, business process definitions, and annotated text.

View Tools

The invention provides functions for different kinds of views of business processes. It provides functions that enable the user to:

Zoom in and zoom out for magnifying and shrinking the map size
 Expand and Collapse Workflows
 Obtain normal flow of workflows and links
 Obtain exception flow of workflows and links: i.e., links for cases where workflows are canceled, declined or revoked.

Mouse Tools

Single Click
 A single click selects a workflow or a link.
 Double Click
 A double click on a workflow loop opens the workflow definition dialog. A double click on a link opens the link definition.

Multiple Select

Holding the shift key while single clicking on multiple workflows or links causes all highlighted workflows or links to be selected. Alternatively, the toolbar contains a "Select" tool.

Click and Drag Workflow to New Location

Moves the workflow loop to a new location on the screen. Automatically adjusts the corresponding links in the map drawing.

Testing Tools

The invention provides a tool for testing and debugging a business process map as follows:

Test for completeness. Causes the software to find all the workflows that do not have complete information.
 Specifically, it finds missing roles, conditions of satisfaction, cycle times and workflow names.

The following is a description of the basic operations performed by the software used to implement the invention:

Start-up

The program can be started by any suitable mechanism depending on the platform.

Annotated text

Free text used to describe the business process. This text is not associated with any specific element of a business map.

Associated Text

Free text associated with each workflow. It can be used to provide a narrative of the workflow in order to construct the narrative of the business process process.

Toolbar

A set of icons in a software package with a GUI, which allows users to select the most frequently used options without going through the menus and dialog boxes.

Export to a Windows Metafile

The Windows metafile is a binary format which allows storing of the business process map as an image. This allows the map to be incorporated in other presentation tools.

Exit

This is the option to exit the program.

Application Window Layout

Each MDI Window (MapView) displays a business process map as above. Each window can be sized, moved, maximized or minimized.

Single-clicking on a map component selects the component (i.e., for cut, copy, delete, hide, etc.) To select multiple components, the shift button must be held down while single-clicking on additional components. Double-clicking on a map component (MapShape) brings up a dialog displaying the properties of the component. Holding the mouse button down over a workflow allows the workflow symbol and name to be dragged to another location. Holding the mouse button down on the "handle" of a Link line allows the link curvature to be changed.

The operation of the tools is based upon typical GUI protocols as follows.

Menu Bar

The structure of the Menu Bar and pulldown menus is as follows:

File.

Contains the features for file handling:
 New. Creates a new map.
 Open. Opens a saved map.
 Save. Saves a map.
 Save As. Offers to save the map under a new name.
 Export. Exports map data to a Windows metafile format.
 Business Process Summary. Displays summary information which includes the following:
  Owner: This refers to the person in charge of modifying the conditions of satisfactions, cycle times, or roles in the workflow.
  Creation date, modification date, and modifier. The date on which the workflow was created, last modified, and by whom this was done.
  Version: the version of business process map.
 Print Map. Prints the map as it appears on the screen.
 Print Report. Prints map data in a tabular report (including, for example, workflow definitions, conditions of satisfaction, form names, link definitions, and the like).
 Page Setup. Specifies map margins, headers, and footers.
 Printer Setup. Standard Windows print dialog for selecting printers, print trays and the like.
 Exit.

Edit.

Contains the Windows-standard features
 Cut. Removes a selected object from the screen and places it in the Windows Clipboard.
 Copy. Copies selected objects to the Clipboard without removing them from the current screen.
 Paste. Places Clipboard contents on the map (if they are either text or previously selected workflows.)
 Delete. Deletes the selected objects from the screen without placing them in the Clipboard.

View.

Contains the tools for viewing a map in different ways
 All. Displays all workflows and workflow links.
 Normal Flow. Displays workflows and links that lead to successful completion.
 Exception Flow. Displays workflows and links that do not lead to successful completion (cancel, for example).
 Missing Information. Displays workflows in which some critical element has not yet been defined.
 Collapse. Hides secondary workflow associated with the selected workflows.

Expand. Expands to display secondary workflows associated with the selected workflow which were hidden by a previously issued Collapse command.

Expand All. Displays all workflows.

Zoom In. Enlarges the display of workflows on the screen by 25% each time it is selected.

Zoom Out. Reduces the display of workflows on the screen by 25% each time it is selected.

Actual Size. Returns the display to 100%.

Tools.

Contains the tools for selecting different modes in the Analyst:

Workflow. Turns on the workflow cursor which in the preferred embodiment is an oval divided into quadrants with arrowheads at the end of each quadrant as shown in FIGS. 1a–1f. When this option is selected, new workflows can be added to the map.

Figure 5:
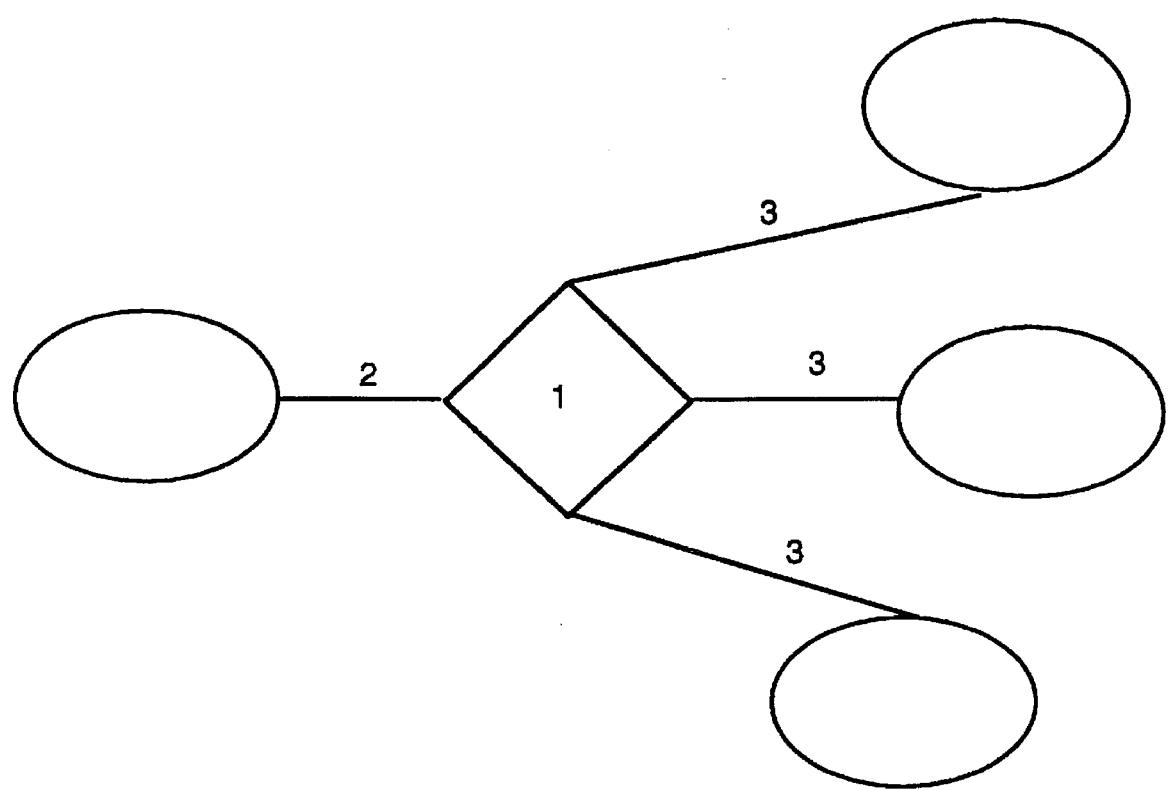
FIG. 5 is an illustration of a conditional link between workflows.

Conditional Link. Turns on the conditional link cursor which in the preferred embodiment is a diamond shape as shown in FIG. 5.

Text. Turns on the text cursor which in the preferred embodiment is an I-beam indicating the insertion point or a pointer with a T (for text) associated with it. When this option is selected, annotation text can be added anywhere on the screen (except inside a workflow) utilizing different fonts, styles and sizes.

Pointer. Turns on the object selection cursor

Normal Flow. Turns on the defining of a normal-flow link.

Exception Flow. Turns on the defining of an exception-flow link (in which the link is one that does not move the workflow toward successful completion, such as when a cancel, decline or revoke in the originating workflow triggers a cancel in the linked workflow).

Properties. Displays the properties dialog relevant to the object currently selected. (For example, displays the workflow definition of the current workflow if a workflow is selected).

Options.

Defaults. Defines the defaults for features of the program, such as the default directory into which to save map files and default workflow types.

Display. Defines the defaults for display of the icon bar and link handles.

Fonts. Defines the default font, style and font size for workflow text and annotations.

Windows.

Contains standard Windows handling options.

Help.

Contains an on-line help system.

Dialogs

Some of the more important dialogs are described below.

File Open (Standard Windows 3.1 File Open)

As well as File Open, several other standard Windows 3.1 dialogs (Printer Setup, Save As etc.) are used.

Workflow Definition

This dialog is displayed by double-clicking on an existing workflow or selecting the Properties menu option when a workflow object is selected on the Map.

Business Process Summary Information

This dialog is presented when a file is saved for the first time (before the Save As dialog), or when the Business Process Summary option is selected from the File menu.

Link Definition

This dialog is displayed by double-clicking on an existing link or selecting the Properties menu option when a Link is selected. Each of the two Listboxes displays the available actions for the "from" and "to" workflow quadrants. One action may be selected from each, in order to define the Trigger and Triggered actions, respectively.

Conditional Link Definition

A Conditional Link Definition dialog is displayed by double-clicking on an existing Conditional Link or selecting the Properties menu option.

Creating a conditional link involves drawing a link between two workflows as usual (but using the Conditional Link Tool). The conditional link will be created between the two selected workflows, using the default trigger and triggered actions for the phase as with normal links. A diamond shape is displayed near the originating workflow. By double-clicking on the diamond, a Conditional Link dialog is presented which allows the user to enter a description of the condition for the conditional link and then shows the origin and target workflows. The user may then access an Origin Link dialog and a Target Links dialog.

Double-clicking on the Origin Link or selecting the Origin Link button in the dialog box of the Conditional Link dialog presents the Origin Link dialog that allows the user to select the trigger act or state.

Double-clicking on one of the Target Links in the dialog box of the Conditional Link dialog presents the Target Links dialog that allows the user to specify the specific condition and the triggered action.

Adding additional Target Links to a Conditional diamond is done by drawing a link from a point on the diamond to a target workflow. The user is then able to edit the resulting Target Link by double-clicking on it.

DESIGN AND IMPLEMENTATION DESCRIPTION

In a preferred embodiment, the software used to implement the workflow analyst application (Analyst) design is based on the Model-View-Controller (MVC) paradigm of object oriented programming. The MVC paradigm divides an application into three main divisions: Model which represents the core application logic, View which represents the user interface logic, and Controller which represents the message and event handling logic that implements the tools for manipulation of objects.

The MVC framework for applications provides a logical split of the different functions in a GUI application. Isolating the core application logic in the Model makes the application more portable, the design more understandable and the implementation extendible. The further logical separation of the event handling in the Controller from the user interface in the View enables the application to be more easily ported to another GUI environment. The Analyst is designed on the MVC paradigm discussed above as shown in FIG. 4. The Model classes describe the business process and its components in terms of a hierarchy of classes. The View Classes draw the workflow map of a business process and its components on different displays including the screen, printer and metafile (i.e., a graphics-format Windows 3.1 metafile on disk, which can be displayed by other Windows programs).

The two highest level classes of the Model and the View provide the framework for a software implementation of the invention. A class designated as the ActWfModel class owns and manages all the model classes (Object Model) such as business processes, workflows etc. ActWfModel is used by the ActWfView class which owns and manages user interface components such as menus, icon bars, dialogs and Multiple Document Interface (MDI) child windows. Only one instance of the ActWfModel and ActWfView objects are allowed.

The ActWfView class receives the menu and toolbar commands from C++/Views and the toolbar. It in turn passes them directly to the active (top level) MDI window (represented by a MapView Controller component object).

The MapView class has two main components, the painting and controller components. The controller component contains the menu and toolbar interpreter 61 as well as the mouse and keyboard interpreter 63 which receive the interaction (inputs) from the user. These are a set of methods that receive input from the user and pass them to the appropriate tool. There are also methods for changing the active tool, namely tool selector 65, e.g. when the user clicks the mouse in an empty area of the window the current tool is called, and when the user clicks the mouse in a current object the appropriate object tool is called to process the click. The tool procedures 67 of MapTool are responsible for managing the creation, deletion, selection of object attributes, selection and dragging of the various objects in the screen. They also handle the automatic linking (selecting a temporary tool) when the mouse is on the border of a specific object. For this they have a close interaction with the shapes in the view with an interface that helps retrieve, set, and prompt user for attributes.

The main methods of the tools are: mouseDn (for mouse down events) mouseDbl (for mouse double click events) mouseMv (for mouse move events), mouseUp (for mouse up events), keyDelete and keyEscape events (for their equivalent key selections). The tool translates mouse up/down sequences into clicks and calls the appropriate methods. It also contains the method getShape to find a specific object in an area of the window. The specific methods for the various tools can be found on the Controller Class Attributes section below.

The shapes provide with a set of methods used by the tools to find them (pointIn, pointInZone, rectIn), calculate areas used (getInvalidRect), change attributes with a properties dialog 45 (showProperties) and change position (beginDraggingAt, draggingAt, endDraggingAt). These methods are in the View Class Attributes section below. There are other methods used that serve as an interface to obtain/set the various object attributes.

The painting component of the MapView class contains the methods to display the image in the Window. This class enumerates all of its objects in that area and issues the paint method in the shape object. Also when the user is dragging an object, the tool object calls the draw method to display the object as it is being dragged. The two main shape methods along with the MapView paint method constitute the Display Module 47. To print or export a map, the print or export command from the file Menu is received at the MapView object which sets up a different environment via MapPrinter and MapMetafile which redefine the display port through which the object will be displayed, and calls the same shape paint procedures. These MapPrinter and MapMetafile classes define the functionality for the print module 48 and export module 49.

The system maintains the main data in the Model classes. Every view class has its model class equivalent where the data is stored. The view classes get all this information from the model classes. The main interface for the model classes is a series of set/get functions to manage the attributes of the class. The functions enable the system to maintain the consistency of the object's data and provide the workflow rules 33 for the data. This model data is the only data that is stored in data files. The process of storing this data is via get/put methods that every model class provides. These two methods in every model class constitute the file I/O module 35 that maintains the map files.

The Model Classes and Model Class Attributes

The Model incorporates model classes which implement the workflow application logic. The model classes describe the business process and its components in terms of a hierarchy of classes. The classes in the model form what is sometimes described as the Object Model for the application. The Object Model is similar to an Entity-Relationship model in data modeling.

The model classes are, in effect, data structures. External (data) attributes of the Model Classes are listed below. Implementation will require additional instance variables (internal data) and methods beyond those described here which depend upon the platform on which the software is to be used. Such additional details would be readily apparent to persons skilled in the art.

ActWfModel—Manages the other classes in the model including any database access and storage. This is the top class of the model and represents a collection of WfBusProcess objects.

WfBusProcess—This is included in a collection in ActWfModel This class provides the logical representation of the business process to be mapped. It includes a collection of map components (WfComponent) as well as information on the creation of the map (Author, creation date, etc.).

| Attribute | Description | Type | Length |
|---|---|---|---|
| Business Process Name | Name of the business process | char | 64 |
| Owner | Owner of the business process | text | 64 |
| Creation Date | Date of creation of the business process map | date | 8 |
| Business Process Version | Version of the business process map | text | 64 |
| Author | Author of the business process map | text | 64 |
| Business Process Cycle Time | Computed cycle time of the business process out of cycle times of workflows | char as 999d999h9 99m | |
| Business Process Cost | Computed cost of the business process out of costs of workflows | | |
| Business Process Price | Computed price of the business process out of prices of workflows | | |

WfComponent—This is an abstract class which provides the base for all the classes which represent components of a business process. It includes the component type, the name and position of the object.

| Attribute | Description | Type | Length |
|---|---|---|---|
| Component key | unique identifier of this component in the business process | int | |
| Component type | One of Workflow, Link, Conditional link or FreeText | enum | |
| Component Name | Name of a Map, Workflow, Link or other component | Character | 64 |
| Origin | Logical position with respect to the origin (0,0) of the Business Process Map. Translated to device units as required for display, printing and metafile output. | VLocation object (x,y) | |

WfAnchor—This is derived from WfComponent. This is an abstract class which provides the meaning for origin/target objects as Workflows and conditional links. It includes the size of the object.

| Attribute | Description | Type | Length |
| --- | --- | --- | --- |
| WfComponent | inherited | WfComponent Object | |
| width | Width of the component | int | |
| height | Height of the component | int | |

WfWorkflow—This class is derived from WfAnchor. It models the logical concept of a workflow, including customer, performer and observers data, conditions of satisfaction, associated text, cost and price as well as cycle times.

| Attribute | Description | Data Type | Length |
| --- | --- | --- | --- |
| WFAnchor | inherited | WfAnchor Object | |
| Primary | identifies if the workflow is the Primary workflow | Boolean | |
| Workflow Type | request or offer | char | 1 |
| Multiple repeating | identifies if workflow is of type multiple repeating | Boolean | |
| Customer Name | name of the person requesting the work | text | 64 |
| Performer Name | name of the person performing the work | text | 64 |
| Observers Names | names of non-participating, but interested, parties | text | 64 |
| Form name | name of the associated form | text | 64 |
| Conditions of satisfaction | Conditions of satisfaction of the workflow | text | 1500 (min) |
| Associated Text | Additional text. | text | 1500 (min) |
| Workflow Computed Cycle Time | cycle time computed out of cycle times of the workflow phases | char as 999h999m | |
| Workflow Cycle Time | days, hours, minutes allowed to complete the workflow | char as 999d999h999m | |
| Proposal Cycle Time | days, hours, minutes allowed to complete the proposal phase of the workflow | char as 999d999h999m | |
| Agreement Cycle Time | days, hours, minutes allowed to reach agreement and complete the agreement phase of the workflow | char as 999d999h999m | |
| Performance Cycle Time | days, hours, minutes allowed to complete the performance phase of the workflow | char as 999d999h999m | |
| Satisfaction Cycle Time | days, hours, minutes allowed to complete the satisfaction phase of the workflow | char as 999d999h999m | |
| Workflow Computed Cost | total cost computed out of workflow phases cost | int | |
| Workflow Cost | cost to complete the workflow | int | |
| Proposal Phase Cost | cost to complete the proposal phase of the workflow | int | |
| Agreement Phase Cost | cost to complete the agreement phase of the workflow | int | |
| Performance Phase Cost | cost to complete the performance phase of the workflow | int | |
| Workflow Computed Price | total price computed out of workflow phases' price | int | |
| Satisfaction Phase Cost | cost to complete the satisfaction phase of the workflow | int | |
| Workflow Price | assessment of price/value associated with the completion of the workflow | int | |
| Proposal Phase Price | assessment of price/value associated with the completion of the proposal phase of the workflow | int | |
| Agreement Phase Price | assessment of price/value associated with the completion of the agreement phase of the workflow | int | |
| Performance Phase Price | assessment of price/value associated with the completion of the performance phase of the workflow | int | |
| Satisfaction Phase Price | assessment of price/value associated with the completion of the satisfaction phase of the workflow | int | |
| Graphical attributes | requested graphical attributes such as style and color used to draw loops that have missing (or dotted or other graphical effect) phases | int(s) | |

WfConditionalLink—This class is derived from WfAnchor. It includes a description text. It documents conditional links between Workflows. The WfConditionalLink components are illustrated in FIG. 5 as a condition shape (diamond) designated as 1), an origin link designated as 2 from a workflow, and target links designated as 3 to workflows.

| Attribute | Description | Type | Length |
| --- | --- | --- | --- |
| WFAnchor | inherited | WfAnchor Object | |
| Description | Text explaining the decision to be made | text | 1500 (min) |

WfLink—This class is derived from WfComponent. It models the logical link between Workflows and Conditional link, including the link type and the trigger and triggered actions in the source and target components, respectively as well as a description of the condition (for conditional links).

| Attribute | Description | Type | Length |
| --- | --- | --- | --- |
| WfComponent | inherited | WfComponent Object | |
| FromPosition | Workflow/State/Sequence from which this Link initiates | pointer to WfPosition Object | |
| ToPosition | Workflow/State at which this Link terminates | pointer to WfPosition Object | |
| TriggerAction | Action (Trigger Action) within the originating Workflow which can initiate this link | | |

-continued

| Attribute | Description | Type | Length |
|---|---|---|---|
| TriggeredAction | Action (Triggered Action) within the target Workflow which is initiated by this link | | |
| Condition | condition that triggers this link (in the case of links from conditionals to workflows) | text | 64 |

WfFreeText—This class is derived from WfComponent. It models the free-form text which may be placed on a map of a business process. It includes the text and its attributes such as justification, word wrapping, border, font and object size.

| Attribute | Description | Type | Length |
|---|---|---|---|
| WfComponent | name, position | WfComponent object | |
| Width | size of the text box | int | |
| Height | size of the text box | int | |
| Text | text of the annotation | text | 64 |
| Font | e.g. "Helv" | text | 20 |
| Size | e.g. 8 | text | 2 |
| Attributes | Bold, underline etc. | Boolean | |
| Alignment | left, right, centered | enum | |
| Border | has a border | Boolean | |
| Word wrapping | this text should/should not wrap | Boolean | |

WfPosition—models the position of the starting or ending point of a link in a Workflow as well as the curvature handles for the link. This object is created by a MapShape or derived classes from a given point in a MapShape.

| Attribute | Description | Type | Length |
|---|---|---|---|
| Phase | phase in the workflow | int | |
| Direction | From, To | int | |
| Sequence | key for anchor - applies to From position and indicates the sequence order for the link in the phase | int | |

The attributes of the model classes described above are the only attributes saved when a map of a business process is stored.

Figure 4:
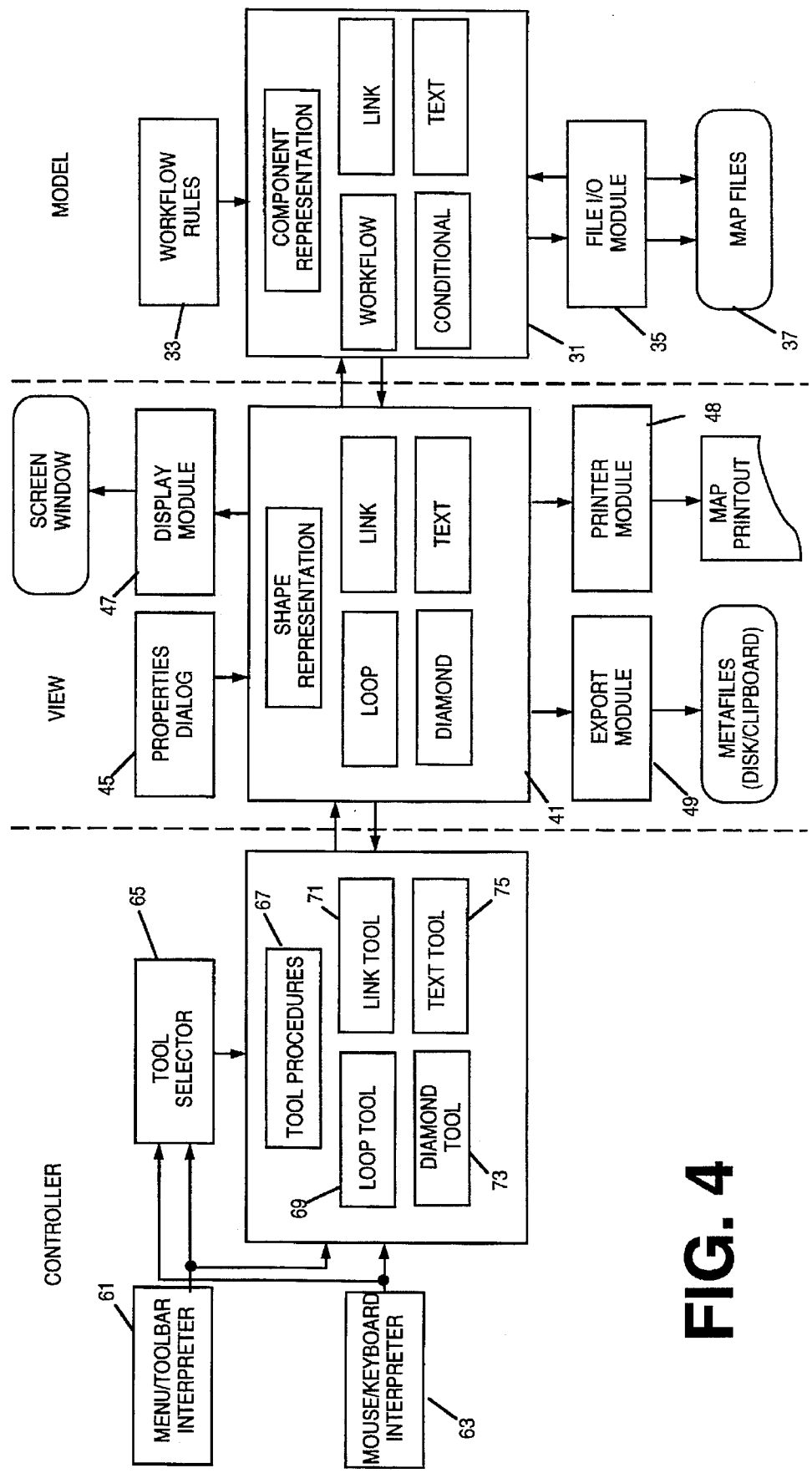
FIG. 4 is a block diagram showing the various functional components of the invented system when implemented as a software system.

The model classes are represented in FIG. 4 within block 31. The Model also utilizes a set of workflow rules 33. These workflow rules are rules that are determined directly by the workflow structure such as the number of phases, the roles, the workflow acts, the acts permitted to a role in each phase, the cycle times that need to be entered, the specific position in the phase line where a link can be drawn from and to (tail and tip). In addition to these structural rules, the following rules are followed:

a workflow cannot be linked to itself if there is a link from workflow A to workflow B, then there cannot be a link from workflow B (or any successor of B) that comes to a phase in workflow A that is prior to the phase of the link from workflow A to workflow B.

A software implementation of the workflow rules and model classes would be well within the ability of persons skilled in the field of the invention in view of the foregoing description.

An I/O module 35 stores the model classes in map files 37 in a storage medium which is typically a high capacity, non-volatile storage device such as a hard disk. The details for implementing I/O module should be readily apparent to persons skilled in the art.

The View Classes and View Class Attributes

The View classes implement the user interface components required to draw the model classes on a display. Each class derived from the WfComponent model class is drawn by a class derived from the MapShape class. The classes in the View are listed below:

ActWfView—This class implements the Multiple Document Interface (MDI) for the application. MapViews, MapPrinter and MapMetafile are classes used by this class to display a map. ActWfView has a collection of ActWfModel as an attribute. The model equivalent is ActWfModel and represents a collection of MapView Objects.

MapView—Each instance of this class provides one MDI Client window for the application. It has a collection of MapShapes to draw various workflow symbols on the map. The model equivalent is WfBusProcess.

| Attribute | Description | Type | Size |
|---|---|---|---|
| View | All, normal, exception, missing | | |
| Orientation | Portrait, landscape | | |
| ZoomLevel | Zooming factor | int | |
| Page Sizes | Several printer related values | | |
| Show Wf Data | Option to display workflow data | | |
| ShowFormIcon | Option to display form icon | | |
| CollShapes | correction of shapes | VOrdCollect | |
| Main methods | | | |
| event handlers | received from C++/ Views | | |
| menu handlers | received from C++/ Views | | |

MapPrinter—This class provides printing services for the application. It uses classes derived from MapShape to draw various workflow symbols on pages to be printed.

MapMetafile—This class provides graphic metafile Map storage for the application. It uses classes derived from MapShape to save the various workflow symbols in a Windows or other platform metafile format.

MapShape—This abstract shape class is used to derive the specific shapes to be drawn on a map. This class provides a layer of abstraction that enables other workflow shapes to be added later to the application. These methods call the specific methods of the objects (MapLoop, MapAnchor, MapDiamond, MapLink, MapText). This includes a reference to the component. The model equivalent is WfComponent.

| Attribute | Description | Type | Size |
|---|---|---|---|
| IsAnchor | Defines an anchor object | Boolean | |
| IsSelected | Defines if the object is currently selected | Boolean | |
| idParent | points to the owner MapView | MapView pointer | |
| idComponent | points to the model object | WfComponent Object | |
| Main methods | | | |
| showProperties | Generates dialog for filling attributes | pure virtual method | |
| getInvalidRect | returns rectangle that object uses | method | |
| pointIn | checks if point is in object. For each one of the objects (MapLoop, MapLink, MapDiamond, MapText) the appropriate "pointIn" method is invoked. Each method returns TRUE or FALSE to indicate if the point is in the object. | method | |
| rectIn | Checks if rectangle is in object. Used for identifying the objects intersection with rectangles. Used for multiple selection of objects that fit in the rectangle. | method | |
| pointInZone | Checks specific zone the point is in (e.g. ShapeZone, LinkZone, DragZone). A "zone" is a geometric area used to identify different functionality that gets applied to the object ("drag zone" used to indicate dragging, "link zone" used to indicate the zone where linking will be assumed, and "shape zone" used to indicate the whole zone that the object relates to). For each one of the objects the appropriate pointInZone method is called. Each such method returns TRUE or FALSE in case the point is in the requested zone. | method | |
| beginDraggingAt | Starts dragging operation on this object. Called from mouseDn event in the drag zone. For each one of the objects the appropriate beginDraggingAt method is called. | method | |
| draggingAt | Performs dragging operation. Called from mouseMv event while dragging. For each one of the objects the appropriate draggingAt method is called. | method | |

| Attribute | Description | Type | Size |
|---|---|---|---|
| endDraggingAt | Ends dragging operation on this object. Called from mouseUp event when dragging. For each one of the objects the appropriate endDraggingAt method is called. | method | |
| paint | Displays this object on port (window, printer, metafile). For each one of the objects the appropriate paint method is called. | method | |
| draw | Displays this object on port while dragging. For each one of the objects the appropriate draw method is called | method | |

MapAnchor—This abstract class is derived from MapShape and represents the objects that can be source/target of MapLinks. The model equivalent is WfAnchor.

| Attribute | Description | Type | Size |
|---|---|---|---|
| idComponent | inherited from MapShape. Model class | | |
| CollFromMapLinks | Collection of links emerging from anchor | VOrdCollect | |
| CollToMapLinks | Collection of links entering anchor | VOrdCollect | |
| Main Methods | | | |
| getLocation | Given a point, returns the starting and ending points where a link can start or end. The getLocation methods in MapLoop and MapDiamond are used to determine the position of incoming and outgoing links. | pure virtual method | |

MapLoop—This class is derived from MapAnchor. It is responsible for drawing and preserving the workflow loop on a map. The model equivalent is WfWorkflow.

| Attribute | Description | Type | Size |
|---|---|---|---|
| idComponent | inherited from MapShape. Model class | | |
| Main Methods | | | |
| getLocation | Given a point, returns the starting and ending points where a link can start or end. The points are: for outgoing links, the starting point of phases 1, 2, 3, 4 and the ending point of phase 4 that is closest to the given point; for incoming links, the ending points of all the phases and the starting point point of phase 1 that is closest to the given point | method | |
| showProperties | Generates dialog for filling attributes | pure virtual method | |
| getInvalidRect | returns rectangle that object uses | method | |
| pointIn | Checks if point is in object. It is called with a point in the map. Returns TRUE if the point is in the current loop, FALSE otherwise. | method | |
| pointInZone | Checks specific zone the point is in (e.g. ShapeZone, LinkZone, DragZone). It is called with a point in or near the loop and will return TRUE of FALSE depending on the zone of the loop that the point is at. | method | |
| paint | Displays this loop in the port (window, printer, metafile). Knows how to display all elements of the loop. | method | |
| draw | Displays this loop in the windows while dragging | method | |

MapDiamond—This class is derived from MapAnchor and is responsible for drawing a diamond shape on a map to represent a conditional junction. The model equivalent is WfConditionalLink.

| Attribute | Description | Type | Size |
|---|---|---|---|
| idComponent | inherited from MapShape. Model class | | |
| Main Methods | | | |
| getLocation | Given a point, returns the starting and ending points where a link can start or end. For incoming and outgoing links, these points are the closest vertex of the four vertices of the diamond. | method | |
| showProperties | Generates dialog for filling attributes | pure virtual method | |
| getInvalidRect | returns rectangle that object uses | method | |
| pointIn | Checks if point is in object Called with a point in the mep. Returns TRUE if the point is in the diamond, FALSE otherwise. | method | |
| pointInZone | Checks specific zone the point is in (e.g. ShapeZone, LinkZone, DragZone). Called with a point in or near the diamond. Returns TRUE if the point is in the diamond and the zone asked for., FALSE otherwise. | method | |
| paint | Displays this diamond in the port. Knows how to display all elements of the diamond. | method | |
| draw | Displays this diamond in the window while dragging | method | |

MapLink—This class is derived from MapShape and is responsible for drawing a link between two anchor shapes on a map. The model equivalent is WfLink.

| Attribute | Description | Type | Size |
|---|---|---|---|
| idComponent | inherited from MapShape. Model class | | |
| Curve | Curve handles and type | MapCurve | |
| Main Methods | | | |
| showProperties | Generates dialog for filling attributes | pure virtual method | |
| getInvalidRect | returns rectangle that object uses | method | |
| pointIn | Checks if point is in object. Called with a point in the map. Returns TRUE if the point is in the link, FALSE otherwise. | method | |
| pointInZone | Checks specific zone the point is in (e.g. ShapeZone, DragZone). Called with a point in or near the link. Returns TRUE if the point is in the link and in the zone asked for, FALSE otherwise. | method | |
| beginDraggingAt | Starts dragging operation on this object | method | |
| draggingAt | Performs dragging operation | method | |
| endDraggingAt | Ends dragging operation on this object | method | |
| paint | Displays this link object in the port. Knows how to display all the elements of the link. | method | |
| draw | Displays this link object in the window while establishing a link or while dragging. When a link is being established it displays incremental segments of the link as the mouse is being moved. | method | |

MapFreeText—This class is derived from MapShape and is used to write free-form text on to a map. The model equivalent is WfFreeText.

| Attribute | Description | Type | Size |
|---|---|---|---|
| idComponent | inherited from MapShape. Model class | | |
| idFont | Font of object | MapFont | |
| Main Methods | | | |
| showProperties | Generates dialog for filling attributes | pure virtual method | |
| getInvalidRect | returns rectangle that object uses | method | |
| pointIn | Checks if point is in object. Called with a point in the map. Returns TRUE if point is in | method | |

-continued

| Attribute | Description | Type | Size |
|---|---|---|---|
| | the text area, FALSE otherwise. | | |
| pointInZone | Checks specific zone the point is in (e.g. ShapeZone, DragZone). Called with a point in or near the text area. Returns TRUE if the point is in the text area and in the zone asked for, FALSE otherwise. | method | |
| paint | Displays this text object in the port. | method | |
| draw | Displays this text object while dragging | method | |

The foregoing view classes are represented in FIG. 4 as elements within block 41.

The other components in the View division namely the properties dialog 45, display module 47 and export module 49 may be implemented as follows.

There is a properties dialog for each one of the objects (loop, diamond, link and text). The appropriate dialog is presented when the user double clicks the mouse button and the cursor is positioned at the object. The properties dialog is also presented when an object is selected and the user selects the Properties function of the Tools menu. Through the properties dialog the user inputs and edits the attributes of the object.

The MapView class has two main components, the painting and controller components. The controller component contains the Menu and Toolbar Interpreter 61 as well as the Mouse and Keyboard Interpreter 63 which receive the interaction from the user. These are a set of methods that receive input from the user and pass them to the appropriate tool. There are also methods for changing the active tool (Tool Selector 67), e.g. when the user clicks the mouse in an empty area of the window the current tool is called, and when the user clicks the mouse in a current object the appropriate object tool is called to process the click.

The Tool Procedures 67 of MapTool are responsible for managing the creation, deletion, selection of object attributes, selection and dragging of the various objects in the screen. They also handle the automatic linking (selecting a temporary tool) when the mouse is on the border of a specific object. For this they have a close interaction with the shapes in the view with an interface that helps retrieve, set, and prompt user for attributes. The main methods of the tools are: mouseDn (for mouse down events) mouseDbl (for mouse double click events) mouseMv (for mouse move events), mouseUp (for mouse up events), keyDelete and keyEscape events (for their equivalent key selections). The tool translates mouse up/down sequences into clicks and calls the appropriate methods. It also contains the method getShape to find a specific object in an area of the window. The specific methods for the various tools can be found on the Controller Class Attributes section.

The shapes provide with a set of methods used by the tools to find them (pointIn, pointInZone, rectIn), calculate areas used (getInvalidRect), change Attributes with Properties Dialog 45 (showProperties) and change position (beginDraggingAt, draggingAt, endDraggingAt). These methods are set forth under View Class Attributes above. There are other methods used that serve as an interface to obtain/set the various object attributes. Details concerning these other methods depend upon the platform under which the invention is implemented, which details would be readily apparent to persons skilled in the art.

The painting component of the MapView class contains the methods to display the image in the Window. This class enumerates all of its objects in that area and issues the paint method in the shape object. Also when the user is dragging an object the tool object calls the draw method to display the object in a different state. This two main shape methods along with the MapView paint method constitutes the Display Module 47. To print or export a map the command is received at the MapView object which sets up a different environment via MapPrinter and MapMetafile which redefine the display port through which the object will be displayed, and calls the same shape paint procedures. These MapPrinter and MapMetafile classes define the functionality for the Print Module 49 and Export Module 48.

The system maintains the main data in the Model classes. Every view class has its model class equivalent where the data is stored. The view classes get all this information from the model classes. The main interface for the model classes is a series of set/get functions to manage the attributes of the class. These functions enable the system to maintain the consistency of the object's data and provide the Workflow Rules 33 for the data. This model data is the only data that is stored in data files. The process of storing this data is via get/put methods that every model class provides. These two methods in every model class constitutes the File I/O module 35 that maintains the map files.

Relationships between Model and View Classes

Each MDI window is implemented by a MapView object. A MapView object uses the MapShapes defined above to draw various shapes in the window. The application details for each shape are stored in a corresponding model class. For example, each MapView object has a WfBusProcess object as an attribute. The WfBusProcess object has an ordered collection of objects derived from the WfComponent class.

For all shapes that need to be painted or repainted, the MapView calls the appropriate paint method for the shape class. The shape class gets elements from the WfComponent derived class that conforms to the shape. For example, if MapShape retrieves a WfWorkflow object from the WfBusProcess object, then the MapView object will draw a MapLoop on the display.

The splitting of the logical attributes from the graphical attributes of a workflow component enables the workflow component to be drawn on any display which implements a set of MapShapes. Both the MapPrinter and MapMetafile classes may implement different logic from the MapView to draw the loops and links.

The Controller Classes and Controller Class Attributes

The Controller division utilizes a menu/tool bar interpreter 61, a mouse/keyboard interpreter 63, a tool selector 65 and a set of tool procedures 67 for the loop tool 69, link tool 71, diamond tool 73 and text tool 75. The implementation details for each of the foregoing elements of the controller division in terms of its classes and their attributes are as follows.

MapTool—This class is an attribute of a MapView and it provides the "standard pointer tool" interpretation of keyboard and mouse events. This tool is set for the map by deselecting all tools under the Tools menu item.

| Attribute | Description | Type | Size |
|---|---|---|---|
| DragLink | Identifies if link dragging is allowed | Boolean | |
| idParent | points to the owner MapView | Map View pointer | |
| idCursor | points to the used cursor | VMouseCursor pointer | |
| SelectedShapes | collection of selected shapes | VOrdCollect | |
| StateVariables | identifies state of the tool | various | |
| Main Methods | | | |
| mouseDn | Receives mouse down event. Calls getShape with a point and gets a shape pointer. If pointer is NULL, then deselect all objects and start a new wide area selection. If pointer is not NULL (there is an object at the point), calls pointInZone to determine the zone of the object. If in drag zone call beginDraggingAt method for the currently selected tool. If in link zone, make LinkTool temporarily the active tool, call startLinking method of LinkTool. | virtual event handler | |
| mouseUp | Receives mouse up event. If dragging, calls the method endDraggingAt for each object in the current selection being dragged. Then calls the draw method of the same objects to erase the dragging display effect. Finally calls getInvalidRect for each object to obtain the coordinates of the display that has been made invalid and will need to be redisplayed, notifies the Windows system that this rectangle is no longer valid. If in wide area selection, end selection process and mark all objects within the rectangular wide area as selected. | virtual event handler | |
| mouseMv | Receives mouse move event. If already dragging, calls the method draggingAt for each object in the current selection being dragged. If forming a wide area selection, then expand wide area selection. Draws the proper cursor shape. | virtual event handler | |
| mouseDbl | Receives mouse double click event. Calls getShape to obtain an object. Calls showProperties method of the object. | virtual event handler | |
| getShape | Obtains shape in position. Called with a point in the window, returns a shape pointer. Returns NULL if there is no object in that position. | virtual method | |
| keyDelete | Receives Del key event. Deletes the currently selected objects. | virtual event handler | |
| keyEscape | Receives Esc key event. Performs no function. | virtual event handler | |

LoopTool—This class is derived from MapTool and it provides the "workflow tool" interpretation to keyboard and mouse events. This tool is set for the map by checking workflow from the Tools menu.

| Attribute | Description | Type | Size |
|---|---|---|---|
| MapTool attributes | Father class attributes | inherited | |
| Main Methods | | | |
| getShape | Overrides MapTool method. manages location and creation of loop objects. Called with a point in the window when the | method | |

| Attribute | Description | Type | Size |
|---|---|---|---|
| | LoopTool is the active tool. Returns the object at the point. If no object is present, it returns a newly created loop. | | |

LinkTool—This class is derived from MapTool and it provides the "link tool" interpretation to keyboard and mouse events. This tool is set for the map by clicking in the boundaries of a workflow or diamond object in the window. This is a controller class. This is always a temporary active tool. The other tools become the active tool through selection made with the tool selector. It is set as the active tool on a mouseDn event in the link zone of a loop, and is reset (no longer the active tool) when a link has been established or the operation canceled.

| Attribute | Description | Type | Size |
|---|---|---|---|
| MapTool attributes Main Methods | Father class attributes | inherited | |
| mouseDn | Receives mouse down event. Called on mouseDn event while the LinkTool is temporarily the active tool. Calls getShape and calls method processLinking with the shape pointer who controls the shape and curvature of the link being created. | event handler | |
| mouseUp | Receives mouse up event. Called on mouseUp event while the LinkTool is temporarily the active tool. Calls getShape to get a shape pointer. If the pointer is an anchor in a loop that is different from the loop where the link starts, and no mouseDn event has happened since linking started, then call createLink or reconnectLink to complete or place the link. If the pointer is anything else, this method performs no function. | event handler | |
| mouseMv | Receives mouse move event. Called on mouseMv event when the LinkTool is temporarily the active tool. Calls getShape to get a shape pointer. If the pointer is an anchor in a loop, it adjusts the mouse position to the proper position for that anchor. Calls draw method of MapLink to draw the appropriate segment of the link. | event handler | |
| keyEscape | Receives Esc key event. Called when the LinkTool is temporarily the active tool. It erases the last handle of the currently being created link. If no handles have been defined, this method performs no function. | event handler | |
| startLinking | Initiates a new link. Called from mouseDn method of MapTool, when the mouseDn event happens in the link zone of a loop object. Sets the LinkTool as the active tool temporarily. | method | |
| processLinking | Processes automatic linking. Called by the mouseDn method with a shape pointer. If the shape is an anchor from a different loop that the one that starts the link, then call createLink or reconnectLink. Otherwise it creates a handle for the link curve (unless the curve already has the maximum number of handles). If there is a handle in the point, then the handle is removed. | method | |
| createLink | creates a new link. Called to complete the creation of a link. Resets the LinkTool, no longer the active tool. | method | |
| reconnectLink | Reconnects a link. Called to change the anchor of the starting or ending point of a link. Resets the LinkTool, no longer the active tool. | method | |

TextTool—This class is derived from MapTool and it provides the "text tool" interpretation to keyboard and mouse events. This tool is set for the map by checking text in the Tools menu.

| Attribute | Description | Type | Size |
|---|---|---|---|
| MapTool attributes Main Methods | Father class attributes | inherited | |
| getShape | Overrides MapTool method. manages location and creation of text objects. Called with a point in the window when the TextTool is the active tool. Returns the object at the point. If no object is present, it returns a newly created text area. | method | |
| mouseUp | Receives mouse up event. If a text object has just been created, calls the showProperties method to enable the user to enter the text. | event handler | |

DiamondTool—This class is derived from MapTool and it provides the "diamond tool" interpretation to keyboard and mouse events. This tool manages the creation and manipulation of conditional junctions (diamonds). This tool is set for the map by checking conditional link in the Tools menu.

| Attribute | Description | Type | Size |
|---|---|---|---|
| MapTool attributes Main Methods | Father class attributes | inherited | |
| getShape | Overrides MapTool method. manages location and creation of diamond objects. Called with a point in the window when the DiamondTool is the active tool. Returns the object at the point. If no object is present, it returns a newly created diamond. | method | |

We claim:

1. A computer based system for creating a representation of a business process and its associated workflows, said system comprising a computer which executes a program, said program including means for generating when said program is executed by said computer i) a component representation of at least a predetermined subset of said business process in terms of its workflows, ii) at least a predetermined subset of links between said workflows based upon a predetermined set of workflow rules, and iii) conditional links between said workflows, each of said conditional links including a conditional junction, an origin link between a source workflow and said conditional junction and at least one target link between said conditional junction and a corresponding number of target workflows.

2. The system defined by claim 1 wherein said generating means also generates a text class for storing user generated annotations for said workflows.

3. The system defined by claim 1 further comprising means for creating a graphical representation of said component representation and said links for display on an output device.

4. The system defined by claim 3 further comprising means for converting user inputs into said graphical representation, said component representation and said links.

5. The system defined by claim 4 wherein said converting means comprises a menu/toolbar interpreter means for determining user inputs based upon menu and toolbar selections.

6. The system defined by claim 4 wherein said converting means comprises a mouse/keyboard interpreter means for determining user inputs based upon user movements of a mouse, mouse button position and keyboard inputs.

7. The system defined by claim 4 wherein said converting means comprises tool procedure means for selecting one of a set of predetermined tools based upon a user input.

8. The system defined by claim 7 wherein said set of predetermined tools includes a workflow tool.

9. The system defined by claim 7 wherein said set of predetermined tools includes a link tool.

10. The system defined by claim 7 wherein said set of predetermined tools includes a conditional link tool.

11. The system defined by claim 7 wherein said set of predetermined tools includes a text tool.

12. The system defined by claim 1 further comprising means for creating a graphical representation of said component representation, said links and said conditional links for display on an output device.

13. The system defined by claim 12 further comprising means for converting user inputs into said graphical representation, said component representation, said links and said conditional links.

14. The system defined by claim 13 wherein said converting means comprises a menu/toolbar interpreter means for determining user inputs based upon menu and toolbar selections.

15. The system defined by claim 13 wherein said converting means comprises a mouse/keyboard interpreter means for determining user inputs based upon user movements of a mouse, mouse button position and keyboard inputs.

16. The system defined by claim 13 wherein said converting means comprises tool procedure means for selecting one of a set of predetermined tools based upon a user input.

17. The system defined by claim 13 wherein said set of predetermined tools includes a workflow tool.

18. The system defined by claim 16 wherein said set of predetermined tools includes a link tool.

19. The system defined by claim 16 wherein said set of predetermined tools includes a conditional link tool.

20. The system defined by claim 16 wherein said set of predetermined tools includes a text tool.

21. The system defined by claim 1 wherein said workflows each have a predetermined plurality of phases and said system further includes means for calculating a cycle time for said workflows and for each of said phases.

22. The system defined by claim 1 wherein said workflows each have a predetermined plurality of phases and said system further includes means for calculating cost and price for said workflows and for each of said phases.

23. The system defined by claim 1 wherein each of said workflows has a structure specifying a number of phases, a set of roles, a set of workflow acts and said workflow rules are rules that are determined directly by the workflow structure and include the number of phases, the roles, the workflow acts, the workflow acts permitted to a role in each state, the cycle times for each phase, a position in a phase line where a link can be drawn from and to.

24. The system defined by claim 23 wherein the workflow rules further comprise a rule that a workflow cannot be linked to itself.

25. The system defined by claim 23 wherein the workflow rules further comprise a rule that if there is a link from a workflow A to a workflow B, then there cannot be a link from the workflow B or any successor of workflow B that comes to a phase in workflow A that is prior to the phase of the link from workflow A to workflow B.

26. A computer based method for creating a representation of a business process and its associated workflows, said method comprising the steps of:

a) executing a computer program by a computer;

b) said program generating when said program is executed by said computer i) a component representation of at least a predetermined subset of said business process in terms of its workflows, ii) at least a predetermined subset of links between said workflows based upon a predetermined set of workflow rules, and iii) conditional links between said workflows, each of said conditional links including a conditional junction, an origin link between a source workflow and said conditional junction and at least one target link between said conditional junction and a corresponding number of target workflows.

* * * * *